United States Patent [19]

Yamazaki

[11] Patent Number: 5,062,318
[45] Date of Patent: Nov. 5, 1991

[54] BICYCLE GEAR CRANK ASSEMBLY

[75] Inventor: Toshimasa Yamazaki, Sakai, Japan

[73] Assignee: Maeda Industries, Ltd., Osaka, Japan

[21] Appl. No.: 617,810

[22] Filed: Nov. 26, 1990

[30] Foreign Application Priority Data

Dec. 5, 1989 [JP] Japan .............................. 1-141287[U]

[51] Int. Cl.⁵ .............................................. G05G 1/14
[52] U.S. Cl. .................................. 74/594.2; 74/594.1
[58] Field of Search ............................ 74/594.1–594.6; 474/160

[56] References Cited

U.S. PATENT DOCUMENTS

| | | | |
|---|---|---|---|
| 3,919,898 | 11/1975 | Sugino | 74/594.2 |
| 4,009,621 | 3/1977 | Segawa | 74/594.2 |
| 4,259,880 | 4/1981 | Ueno | 74/594.2 |
| 4,425,824 | 1/1984 | Koch | 74/594.2 |
| 4,439,172 | 3/1984 | Segawa | 474/160 |
| 4,583,422 | 4/1986 | Boyd | 74/594.2 |
| 4,594,910 | 6/1986 | Nagano | 74/594.1 X |
| 4,793,208 | 12/1988 | Bregnard et al. | 74/594.2 |

FOREIGN PATENT DOCUMENTS

| | | | |
|---|---|---|---|
| 957569 | 2/1950 | France . | |
| 1256502 | 2/1961 | France | 74/594.2 |
| 431528 | 7/1935 | United Kingdom | 74/594.2 |
| 577887 | 2/1945 | United Kingdom . | |
| 921614 | 3/1963 | United Kingdom | 74/594.2 |

Primary Examiner—Vinh T. Luong
Attorney, Agent, or Firm—William H. Eilberg

[57] ABSTRACT

A bicycle gear crank assembly includes a crank having a boss portion fittable to a crank shaft, and a chainwheel mounted on the crank boss portion. The chainwheel includes a largest sprocket and at least one smaller sprocket coaxial with the largest sprocket. The crank boss portion is provided with backup arms located on the side of the largest sprocket laterally away from the smaller sprocket. The backup arms extend radially outward from the crank boss portion to contact the largest sprocket radially outwardly of the crank boss portion, so that the backup arms prevent the largest sprocket from laterally bending in a direction away from the smaller sprocket.

6 Claims, 2 Drawing Sheets

BICYCLE GEAR CRANK ASSEMBLY

BACKGROUND OF THE INVENTION

1. Field of the Invention

This invention relates to a bicycle gear crank assembly which is rotated by a rider to drive the bicycle.

2. Description of the Prior Art

A gear crank assembly for a bicycle consists of a crank having a boss portion fixed to one end of a crank shaft, and a chainwheel (front gear) mounted to the crank boss portion for rotation therewith. The crank of the gear crank assembly forms a pair with another crank fixed to the other end of the crank shaft, whereas the chainwheel is connected to a freewheel (rear gear) by means of a chain. Thus, when the paired cranks are rotated by the rider, the chainwheel is rotated together with the freewheel to drivingly rotate the rear wheel of the bicycle.

In actual running, the crank and chainwheel of the gear crank assembly are frequently subjected to a large pedalling force particularly at the time of accelerating and/or running on an upward slope. Thus, the chainwheel, which itself is mechanically strong enough, must be mounted to the crank in such a way as to withstand any pedalling force.

In a most typical form, the chainwheel is made to have a central mounting bore which is serrated, and the boss portion of the crank is externally serrated for non-rotatably press-fitting in the mounting bore of the chainwheel. To complete the assembly, the crank boss portion is subjected to calking to axially retain the chainwheel relative to the crank boss portion. Obviously, this manner of mounting can be performed very easily because there is no need to conduct bolting the chainwheel to the crank boss portion.

The typical form of gear crank assembly is acceptable as long as the chainwheel includes only a single sprocket. However, the typical form of gear crank assembly becomes problematic if the chainwheel is made to have two or more diametrically different sprockets in an attempt to increase the number of speeds obtainable in combination with a multiple freewheel. The problem is now described.

As is well known, in shifting the chain from one sprocket to another of a multiple chainwheel, the chain is laterally displaced by a front derailleur relative to the chainwheel. Such chain shifting occurs relatively easily when shifting from a largest sprocket to a smaller sprocket because the chain needs only to fall down to the smaller sprocket without laterally pressing against the smaller sprocket. However, when shifting the chain from the smaller sprocket to the largest sprocket, the chain must laterally press the largest sprocket before completely shifting thereto. Such lateral pressing may cause the largest sprocket to bend laterally away from the smaller sprocket, thus hindering smooth chain shifting in addition to damaging the chain or the teeth of the largest sprocket The lateral bending of the largest sprocket may be prevented by enlarging the wall thickness of that sprocket. However, such a solution cannot be readily adopted because the wall thickness of the largest sprocket (and other sprockets as well) is inevitably limited by the wanted overall weight and by the dimensions of the chain.

U.S. Pat. No. 4,259,880 to Ueno discloses a gear crank assembly which comprises a crank having a boss portion formed with a plurality of integral sprocket mounting arms extending radially outward from the boss portion. The assembly further comprises a multiple chainwheel including two diametrically different sprockets fixedly mounted to the sprocket mounting arms by means of bolting.

According to the arrangement of Ueno, the larger (largest) sprocket of the chainwheel, instead of being directly mounted to the crank boss portion, is mounted to the sprocket mounting arms which has a substantial radial length. Thus, the radial length (from the tooth tips to the bolt connection) of the larger sprocket itself can be rendered correspondingly smaller, so that the larger sprocket is unlikely to bend laterally even if a large bending force is applied thereto.

However, the arrangement proposed by Ueno requires bolting operation for mounting the larger sprocket to the sprocket mounting arms of the crank boss portion, consequently requiring a longer time for mounting than simply fitting a sprocket. Further, the configuration of the larger sprocket departs very greatly from a typical sprocket configuration, consequently resulting in a cost increase for production. Thus, the arrangement of Ueno is acceptable only for high grade bicycles wherein more importance is placed on the performance than on cost.

SUMMARY OF THE INVENTION

It is, therefore, an object of the present invention to provide a gear crank assembly wherein a largest sprocket can be effectively prevented from bending laterally outward with a simple and cheap arrangement.

Another object of the present invention is to provide a gear crank assembly which, while enjoying the advantage described above, provides an appearance resembling that of a high grade gear crank assembly.

A further object of the present invention is to provide a gear crank assembly which can be assembled very easily while enjoying the advantage described above.

According to the present invention, there is provided a gear crank assembly comprising: a crank having a boss portion fittable to a crank shaft; and a chainwheel including a largest sprocket and at least one smaller sprocket coaxial with the largest sprocket, the largest sprocket having a radially inner margin mounted on the boss portion; wherein the boss portion of the crank is provided with a sprocket backup means located on the side of the largest sprocket laterally away from the smaller sprocket, the backup means extending radially outward from the boss portion to contact the largest sprocket radially outwardly of the inner margin, so that the backup means prevents the largest sprocket from laterally bending in a direction away from the smaller sprocket.

The basic idea of the present invention resides in that the backup means, which has been conventionally utilized for mounting the chainwheel, is made to fulfill the sole function of laterally supporting the largest sprocket against bending laterally outward. Thus, the inner margin of the largest sprocket may be mounted directly on the crank boss portion without any necessity of bolting the largest sprocket to the backup means, thereby facilitating the assembling operation. Further, the largest sprocket has a configuration which resembles that of a typical cheap sprocket, so that the largest sprocket can be manufactured at a low cost in a conventional way.

According to a preferred embodiment, the largest sprocket has a tooth carrying ring portion and a plurality of stays extending radially inward from the ring portion, whereas the backup means comprises a plurality of backup arms extending radially outward from the crank boss portion in corresponding relation to the stays. Due to such an arrangement, the overall gear crank assembly can provide an appearance which is substantially identical to that of a high grade gear crank assembly in spite of the simple configuration provided by the largest sprocket itself.

Other features, advantages of the present invention will be fully understood from the following detailed description of the preferred embodiment given with reference to the accompanying drawings.

DETAILED DESCRIPTION OF THE PREFERRED EMBODIMENT

Figure 1:
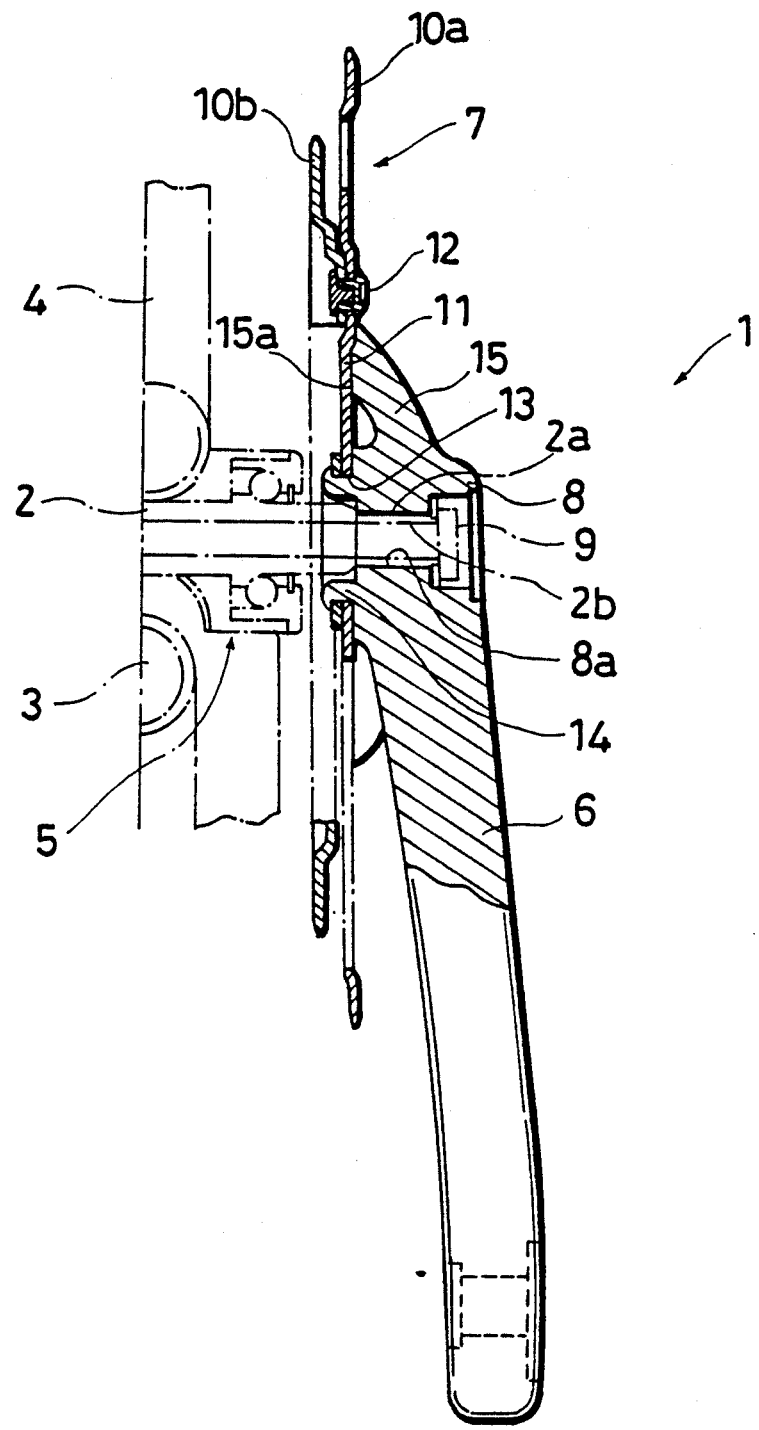
FIG. 1 is a front view, in central vertical section, showing a gear crank assembly embodying the present invention.
Figure 2:
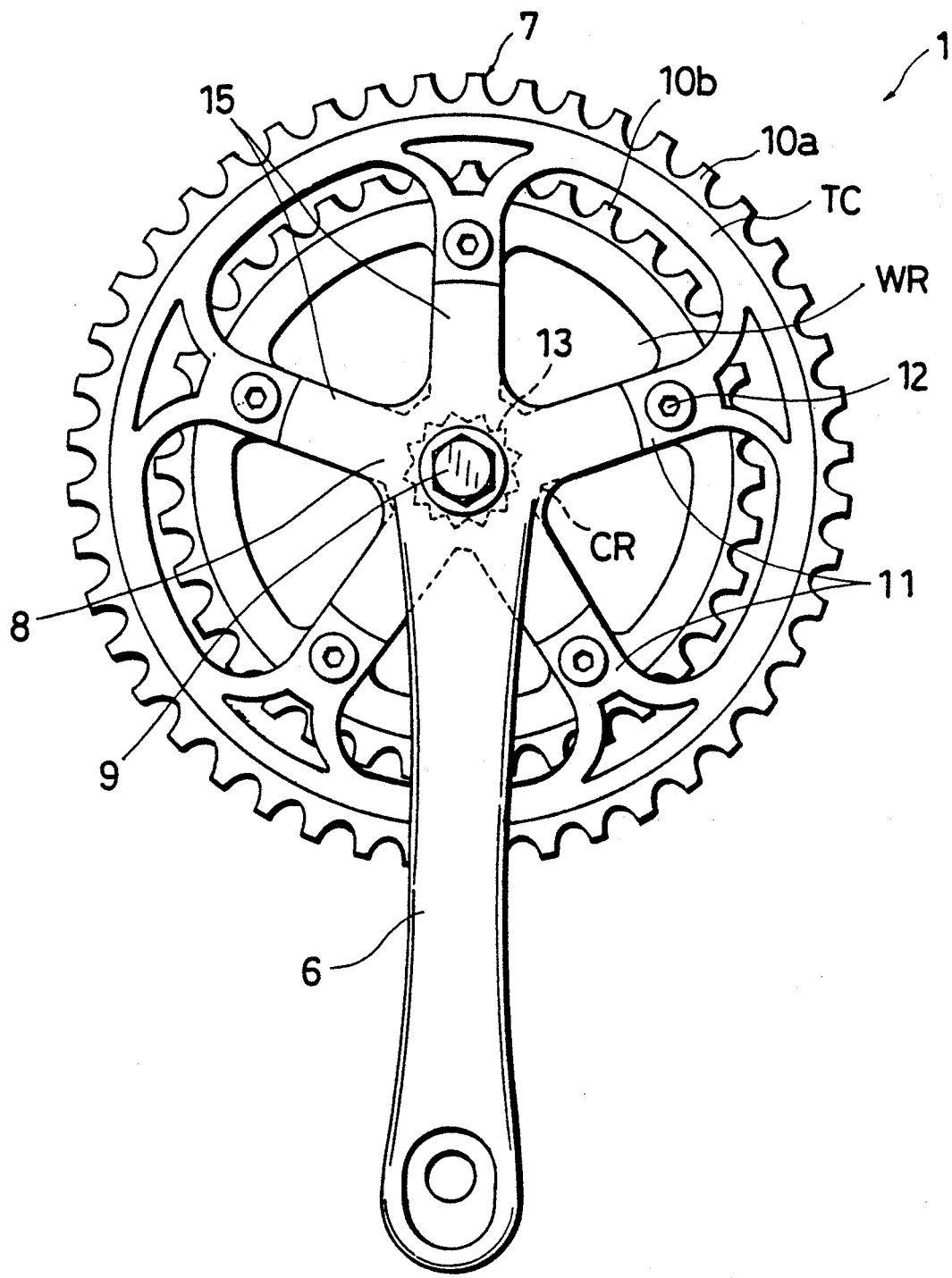
FIG. 2 is a side view showing the same gear crank assembly.

Referring to FIGS. 1 and 2, there is shown a gear crank assembly which is generally designated by reference numeral 1. The gear crank assembly 1 is fixedly mounted to a sprocket mounting end 2a of a crank shaft 2 which in turn is rotatably supported by the bottom lug 5 of the bicycle frame. The bottom lug is located at the connection between the seat tube 3 and the down tube 4. It should be appreciated that FIG. 1 shows the bottom lug 5 as viewed from above the bicycle.

The gear crank assembly 1 comprises a crank 6 (normally a right-hand crank) having a boss portion 8 connected to the sprocket mounting end 2a of the crank shaft 2, and a multiple chainwheel (front gear) 7 mounted to the crank boss portion 8. An unillustrated crank (normally a left-hand crank) is mounted to the unillustrated end of the crank shaft 2 to form a pair with the illustrated crank 6.

The sprocket mounting end 2a of the crank shaft 2 is rectangular or otherwise non-circular in cross section, and slightly tapers toward the corresponding shaft extremity. The crank boss portion 8 has a mounting bore 8a which corresponds in configuration to the sprocket mounting end 2a of the crank shaft 2 for non-rotatably fitting thereon. The crank shaft is formed with a threaded axial bore 2b in which a clamping bolt 9 is screwed to retain the crank 6 in place relative to the crank shaft.

According to the illustrated embodiment, the chainwheel 7 consists of two diametrically different sprockets including a larger (largest) sprocket 10a and a smaller (smallest) sprocket 10b coaxial with the larger sprocket. The larger sprocket 10a has a tooth carrying ring portion TC, a central ring portion CR, and a plurality of stays 11 spaced circumferentially and extending radially between the two ring portions. Thus, weight reduction openings WR are formed between the stays 11. The smaller sprocket 10b is connected to the stays 11 of the larger sprocket 10a by means of screws 12.

The central ring portion CR of the larger sprocket 10a has a serrated opening 13, whereas the crank boss portion 8 is formed with a sprocket mounting projection 14 which is correspondingly serrated. Thus, the larger sprocket together with the smaller sprocket 10b is non-rotatable relative to the crank boss portion. The larger sprocket is press-fitted on the sprocket mounting projection 14 and retained thereon by calking the latter, as shown in FIG. 1.

According to the illustrated embodiment, the crank boss portion 8 has a plurality of integral backup arms 15 which extend radially outward from the boss portion in corresponding relation to the stays 11 of the larger sprocket 10a. Each of the backup arms has a contact portion 15a which comes into supporting contact with the corresponding sprocket stay at a position radially outward from the central ring portion CR of the larger sprocket.

With the arrangement described above, the central ring portion CR of the larger sprocket 10a is supported by the sprocket mounting projection 14 of the crank boss portion 8, whereas the stays 11 of the larger sprocket are laterally supported by the backup arms 15 of the crank boss portion. Thus, even if a laterally outward pressing force is applied to the larger sprocket 10a in shifting the chain (not shown) from the smaller sprocket 10b to the larger sprocket, the backup arms 15 effectively prevent the larger sprocket from bending laterally outward.

The backup arms 15 may be formed integrally with the crank 6. Thus, the crank with such backup arms can be produced very easily in a conventional way. Further, the larger sprocket can be mounted on the crank boss portion 8 simply by fitting it on the sprocket mounting projection 14 and subsequent calking without any necessity of bolting to the backup arms 15. Thus, assembly of the chainwheel 7 relative to the crank 6 can be performed very easily at a low cost.

The backup arms 15 together with the crank boss portion 8 can also fulfill the function of concealing the inner peripheral portion of the larger sprocket 10a in addition to laterally supporting the larger sprocket. Thus, the visual attractiveness may be improved by the provision of such backup arms without resulting in a cost increase. Particularly, when the backup arms 15 extend radially outward in corresponding relation to the radial stays 11 of the larger sprocket 10a, the appearance of the gear crank assembly 1 as a whole is substantially identical to that of a high grade gear crank assembly wherein diametrically different sprockets have radial stays directly connected to radial mounting arms of a crank.

The present invention being thus described, it is obvious that the same may be varied in many ways. For instance, the chainwheel 7 may include three or more sprockets. Further, the radial backup arms 15 may be provided in any number or replaced by a single backup disc integral with the crank. Such variations are not to be regarded as a departure from the spirit and scope of the invention, and all such modifications as would be obvious to those skilled in the art are intended to be included within the scope of the following claims.

I claim:

1. A gear crank assembly for attachment to a crank shaft comprising: a crank having a boss portion for fitting to a crank shaft; and a chainwheel including a largest sprocket and at least one smaller sprocket coaxial with said largest sprocket, said largest sprocket having a radially outer tooth carrying portion and a central portion mounted on said boss portion, said largest sprocket further having a plurality of stays extending radially outward from said central portion to said tooth carrying portion to define weight reduction openings between said stays, wherein said boss portion of said crank is provided with a sprocket backup means located on the side of said largest sprocket laterally away from said smaller sprocket, said backup means extending radially outward from said boss portion beyond said central portion of said largest sprocket but short of said tooth carrying portion of said largest sprocket to contact each of said stays at least at an intermediate portion thereof, so that said backup means prevents said largest sprocket form laterally bending in a direction away from said smaller sprocket.

2. The gear crank assembly according to claim 1, wherein said backup means is formed as one piece with said boss portion of said crank.

3. The gear crank assembly according to claim 1, wherein said backup means comprises a plurality of backup arms extending radially outward from said boss portion of said crank in corresponding relation to said stays, the length of said backup arms being smaller than that of said stays.

4. The gear crank assembly according to claim 3, wherein the width of said backup arms corresponds to that of said stays.

5. The gear crank assembly according to claim 1, wherein said central portion of said largest sprocket is formed with a serrated mounting bore, said boss portion of said crank having a mounting projection which is serrated for non-rotatably fitting into said mounting bore of said largest sprocket.

6. The gear crank assembly according to claim 1, wherein said smaller sprocket is connected to said stays of said largest sprocket.

* * * * *